United States Patent
Smith et al.

(10) Patent No.: US 10,417,140 B2
(45) Date of Patent: Sep. 17, 2019

(54) STREAMING TRANSLATION LOOKASIDE BUFFER

(71) Applicants: Advanced Micro Devices, Inc., Sunnyvale, CA (US); ATI Technologies ULC, Markham (CA)

(72) Inventors: Wade K. Smith, Sunnyvale, CA (US); Kostantinos Danny Christidis, Markham (CA)

(73) Assignees: ADVANCED MICRO DEVICES, INC., Santa Clara, CA (US); ATI TECHNOLOGIES ULC, Markham, Ontario (CA)

( * ) Notice: Subject to any disclaimer, the term of this patent is extended or adjusted under 35 U.S.C. 154(b) by 0 days.

(21) Appl. No.: 15/442,487

(22) Filed: Feb. 24, 2017

(65) Prior Publication Data

US 2018/0246816 A1    Aug. 30, 2018

(51) Int. Cl.
*G06F 12/1027* (2016.01)
*G06F 12/1081* (2016.01)
*G06F 12/1009* (2016.01)
*G06F 9/38* (2018.01)

(52) U.S. Cl.
CPC ........ *G06F 12/1027* (2013.01); *G06F 9/3887* (2013.01); *G06F 12/1009* (2013.01); *G06F 12/1081* (2013.01); *G06F 2212/6026* (2013.01); *G06F 2212/654* (2013.01); *G06F 2212/681* (2013.01); *G06F 2212/684* (2013.01)

(58) Field of Classification Search
CPC ............ G06F 12/1027; G06F 12/1009; G06F 12/1081; G06F 9/3887; G06F 2212/681; G06F 2212/684
See application file for complete search history.

(56) References Cited

U.S. PATENT DOCUMENTS

| | | | | |
|---|---|---|---|---|
| 2005/0160229 A1* | 7/2005 | Johns | .................. | G06F 12/1027 711/137 |
| 2006/0101226 A1* | 5/2006 | Benhase | ............. | G06F 12/1081 711/203 |
| 2006/0179236 A1* | 8/2006 | Shafi | .................. | G06F 12/0862 711/137 |
| 2006/0230252 A1* | 10/2006 | Dombrowski | ...... | G06F 12/1027 711/205 |

(Continued)

FOREIGN PATENT DOCUMENTS

| EP | 1 139 222 A1 | 10/2001 |
|---|---|---|
| WO | 2016/167912 A1 | 10/2016 |

OTHER PUBLICATIONS

Extended European Search Report, EP Patent Application No. 17 159 125.8, dated Sep. 13, 2017, 4 pages.

*Primary Examiner* — Tasnima Matin
(74) *Attorney, Agent, or Firm* — Volpe and Koenig, P.C.

(57) ABSTRACT

Techniques are provided for using a translation lookaside buffer to provide low latency memory address translations for data streams. Clients of a memory system first prepare the address translation cache hierarchy by requesting that a translation pre-fetch stream is initialized. After the translation pre-fetch stream is initialized, the cache hierarchy returns an acknowledgment of completion to the client, which then begins to access memory. Pre-fetch streams are specified in terms of address ranges and are performed for large contiguous portions of the virtual memory address space.

14 Claims, 6 Drawing Sheets

(56) References Cited

U.S. PATENT DOCUMENTS

| | | | |
|---|---|---|---|
| 2006/0248281 A1* | 11/2006 | Al-Sukhni | G06F 9/383 |
| | | | 711/137 |
| 2007/0283125 A1* | 12/2007 | Manczak | G06F 11/3466 |
| | | | 711/207 |
| 2008/0028181 A1* | 1/2008 | Tong | G06F 3/14 |
| | | | 711/207 |
| 2011/0010521 A1* | 1/2011 | Wang | G06F 12/1027 |
| | | | 711/207 |
| 2011/0202724 A1* | 8/2011 | Kegel | G06F 12/1027 |
| | | | 711/118 |
| 2012/0226888 A1* | 9/2012 | Rychlik | G06F 12/1027 |
| | | | 711/207 |
| 2013/0227245 A1* | 8/2013 | Gupta | G06F 12/1027 |
| | | | 711/205 |
| 2014/0052956 A1* | 2/2014 | Moll | G06F 12/1036 |
| | | | 711/205 |
| 2016/0062894 A1 | 3/2016 | Schwetman et al. | |

* cited by examiner

STREAMING TRANSLATION LOOKASIDE BUFFER

TECHNICAL FIELD

The disclosed embodiments are generally directed to virtual memory address translations, and, in particular, to a streaming translation lookaside buffer.

BACKGROUND

Virtual memory addressing is a mechanism by which a system obscures the physical addresses of memory locations for the purposes of security and ease of memory management. For example, the operating system controls virtual address mapping such that an application accesses data via virtual addresses and cannot access data for other applications or the operating system. In another example, the operating system can move data between physical addresses, while maintaining the same virtual addresses for that data, thereby hiding memory management operations from the applications.

Virtual memory addressing requires an address translation step. More specifically, to access memory via virtual addresses, the virtual addresses are first translated to physical addresses and memory is accessed based on the physical addresses. Address translations are stored in page tables, which can be quite large. To reduce the latency associated with fetching address translations, address translation caches referred to as translation lookaside buffers are provided.

BRIEF DESCRIPTION OF THE DRAWINGS

A more detailed understanding may be had from the following description, given by way of example in conjunction with the accompanying drawings wherein.

DETAILED DESCRIPTION

Techniques are provided for using a translation lookaside buffer to provide low latency memory address translations for data streams. Some clients in a computer system perform "streaming" memory operations, such as sequentially processing data stored in large sections of memory having contiguous virtual addresses. For such clients, in the traditional memory access model, in which the clients make memory access requests made via virtual addresses that are translated by traversing an address translation cache hierarchy, misses can occur in the address translation cache hierarchy. Such misses result in memory access latency that can result in unacceptable performance for real-time applications.

The present disclosure provides a different model for memory accesses. Clients of a memory system first prepare the address translation cache hierarchy by requesting initiation of an address translation pre-fetch stream. After the stream is initialized, the cache hierarchy returns an acknowledgment of completion to the client, which then begins to access memory at addresses corresponding to those specified for the stream. The client performs memory accesses in a monotonically increasing manner in terms of virtual memory address. As the client performs memory accesses, the address translation cache hierarchy discards translations already used to pre-fetch new translations, attempting to stay ahead of the memory accesses performed by the client.

The address translation cache hierarchy streams in the address translations from page tables, utilizing overfetch—the fact that reads from the page table return multiple translations due to the translations being smaller than the smallest unit with which reads occur—to improve fetch speed. The address translation cache hierarchy uses double buffering to hide the pre-fetch latency, where double buffering involves pre-fetching address translations for a client while also performing address translations for the client.

Figure 1:
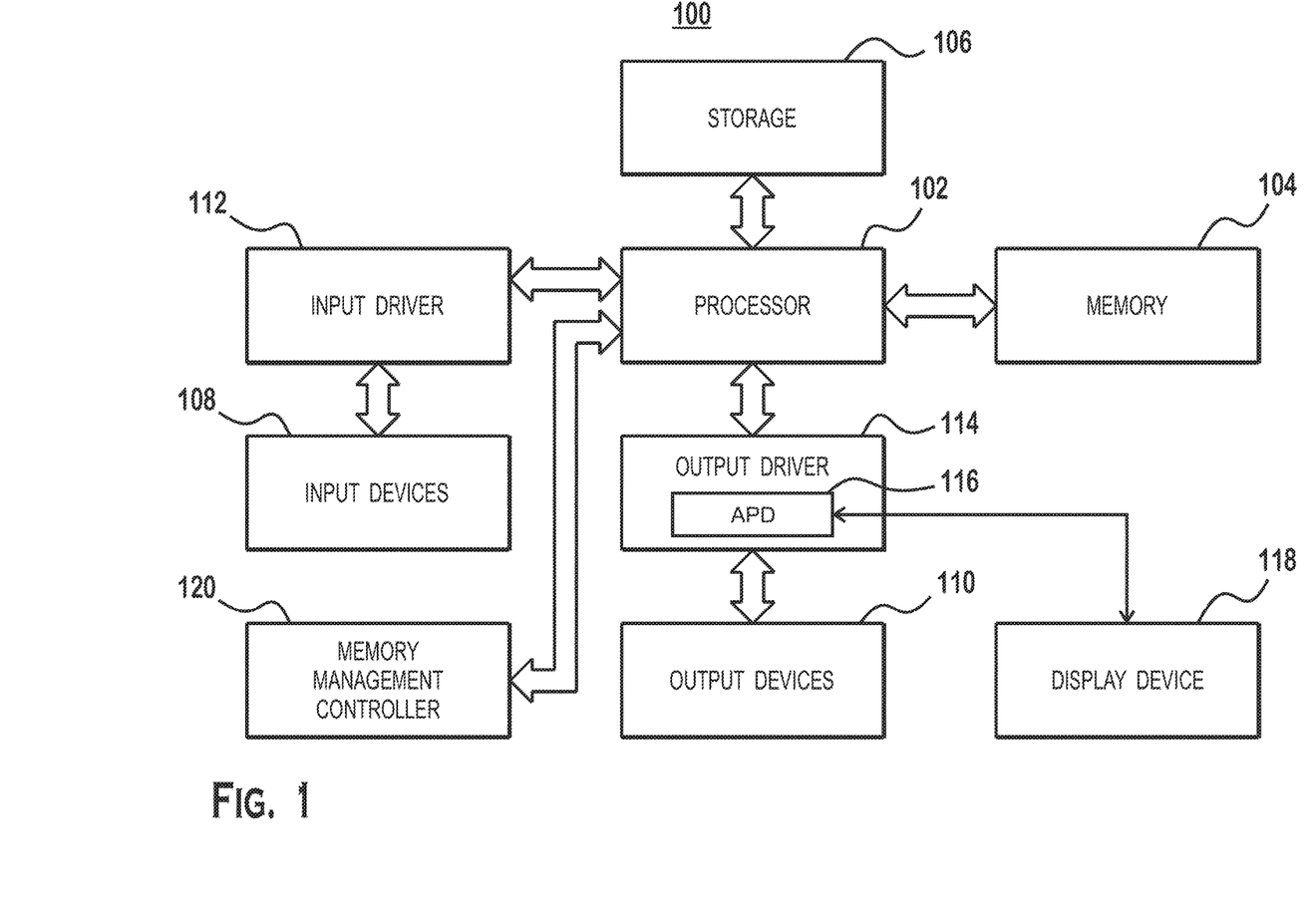
FIG. 1 is a block diagram of an example device in which one or more disclosed embodiments may be implemented.

FIG. 1 is a block diagram of an example device 100 in which one or more aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 also optionally includes an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device (APD) 116 which is coupled to a display device 118. The APD is configured to accept compute commands and graphics rendering commands from processor 102, to process those compute and graphics rendering commands, and to provide pixel output to display device 118 for display.

The APD 116 includes one or more parallel processing units configured to perform computations in accordance with a single-instruction-multiple-data ("SIMD") paradigm. However, functionality described as being performed by the APD 116 may also be performed by processing devices that do not process data in accordance with a SIMD paradigm.

A memory management controller 120, coupled to the processor 102 and to other units, assists with accessing memory via address translation streams. More specifically, in response to receiving memory access requests, the processor 102 performs virtual-to-physical address translations and accesses memory based on the translated physical addresses.

Figure 2:
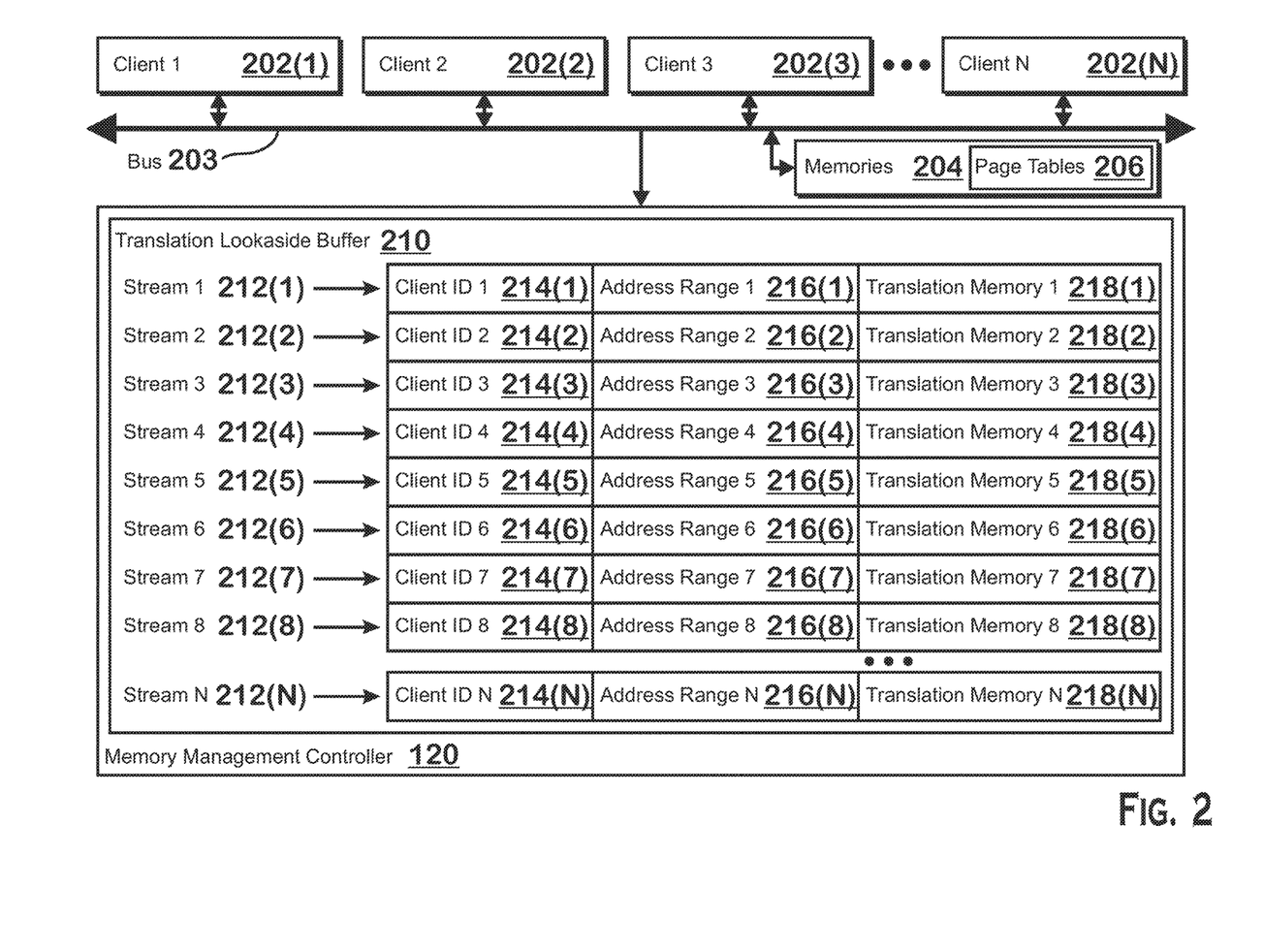
FIG. 2 is a block diagram illustrating details of the memory management controller, according to an example.

FIG. 2 is a block diagram illustrating details of the memory management controller 120, according to an example. Several clients 202 are illustrated. The clients 202 represent units of the device 100, or units attached to the device 100, that access memories 204 to process data for various purposes. Examples of clients 202 include graphics processing units ("GPUs"), video encoders, video decoders, camera controllers that read camera sensor data and write that sensor data to memories 204, embedded general purpose micro-controllers, interrupt controllers, general purpose direct memory access ("DMA") engines, or any other unit that reads or writes data in memories. The memories 204 include one or more memory units that store data for processing by the clients 202 and possibly by other units.

Some clients 202 are "high performance" and access large portions of memory in a very short amount of time. In an example, a 60 frame-per-second camera captures high resolution frames of data into a buffer. A camera controller (one of the clients 202) reads the data from the buffer into a portion of memories 204 (such as system memory 104) for processing by, for example, an application being executed by the processor 102.

Part of accessing data involves memory address translation. More specifically, units often access memory via virtual addresses, rather than physical addresses. Virtual addressing is a mechanism by which the operating system obscures the physical memory space for applications and other entities operating in user space. Applications access data using virtual addresses so that the operating system can control and migrate data in physical memory and also to prevent applications from accessing system data or data for other applications.

Memory address translation involves translating the virtual addresses into physical addresses so that data, which is ultimately accessed via physical address, can be read from or written to. Page tables 206, stored in the memories 204, store address translations that associate virtual addresses with physical addresses. Page tables 206 store mappings for various pages in a memory space. Because the number of pages can be very large, page tables 206 are stored in general purpose memory, such as system memory 104, which is characterized by large capacity but high latency as compared with more dedicated memories such as caches. For this reason, a translation lookaside buffer 210 ("TLB") is provided to store memory address translations that are more relevant to current processing tasks than other memory address translations. The translation lookaside buffer 210 acts as a cache memory in some respects, in that the translation lookaside buffer 210 has lower latency and faster access speed at the cost of lower capacity than general purpose memory such as the system memory 104 or other memories 204.

The translation lookaside buffer 210 services multiple streams 212 from the clients 202. Each stream 212 represents a set of memory operations that uses a specific set of memory address translations. A stream is defined by a client identifier 214, which uniquely identifies a particular client 202, as well as a virtual address range 216, which defines start and end virtual memory addresses of the stream 212. The translation memory 218 associated with a stream includes memory elements that store translations for use by the client 202 associated with that stream 212.

In one example, a stream 212 comprises a set of memory operations to read data in a buffer associated with a camera sensor and write that data to system memory 104. Before this data can be read and written, address translations for the virtual memory addresses referencing that data are fetched from memory 104 and stored in a translation memory 218 associated with the stream 212. After the address translations are fetched, the client 202 performs the memory accesses by requesting the physical addresses, based on virtual addresses, stored in the associated translation memory 218, and then accessing data in system memory 104 based on those translations.

The address translations fetched by the translation lookaside buffer 210 for a stream are contiguous in the virtual memory address space (though of course not necessarily contiguous in the physical memory address space). The contiguous portion of the virtual memory address space is defined via the address range 216, which defines a beginning and end virtual memory address for which address translations are to be fetched. Before beginning memory operations (such as reading to or writing from) for a particular contiguous segment of the virtual memory address space, a client 202 explicitly requests the TLB 210 to initialize a stream that causes address translations for the contiguous portions of the virtual memory address space to be prefetched into a translation memory 218 in the TLB 210. Once the TLB 210 has initialized the stream, the TLB 210 informs the client 202 that initialization is complete. At this point, the client 202 performs memory operations by transmitting requests to access the memories 204 based on virtual addresses to the memory management controller 120, which performs the requested operations for the client 202, using translations stored in the TLB 210. As the client 202 advances in the stream, the TLB 210 continues to prefetch address translations for further accesses in the stream, attempting to stay ahead of the client 202 by a number of translations specified by a prefetch depth. The TLB 210 overwrites translations already used in order to write in translations for addresses further in the stream. After the client is finished with a stream, the client 202 requests that the stream 212 be invalidated, so that the data structures used to store information for the stream 212 can be used for other streams 212.

The TLB 210 is capable of fetching memory address translations for multiple streams 212 within a particular time period (e.g., simultaneously or approximately simultaneously). The TLB 210 thus includes multiple fetch hardware resources capable of probing the page tables 206 to obtain memory address translations for the different streams 212.

Figure 3:
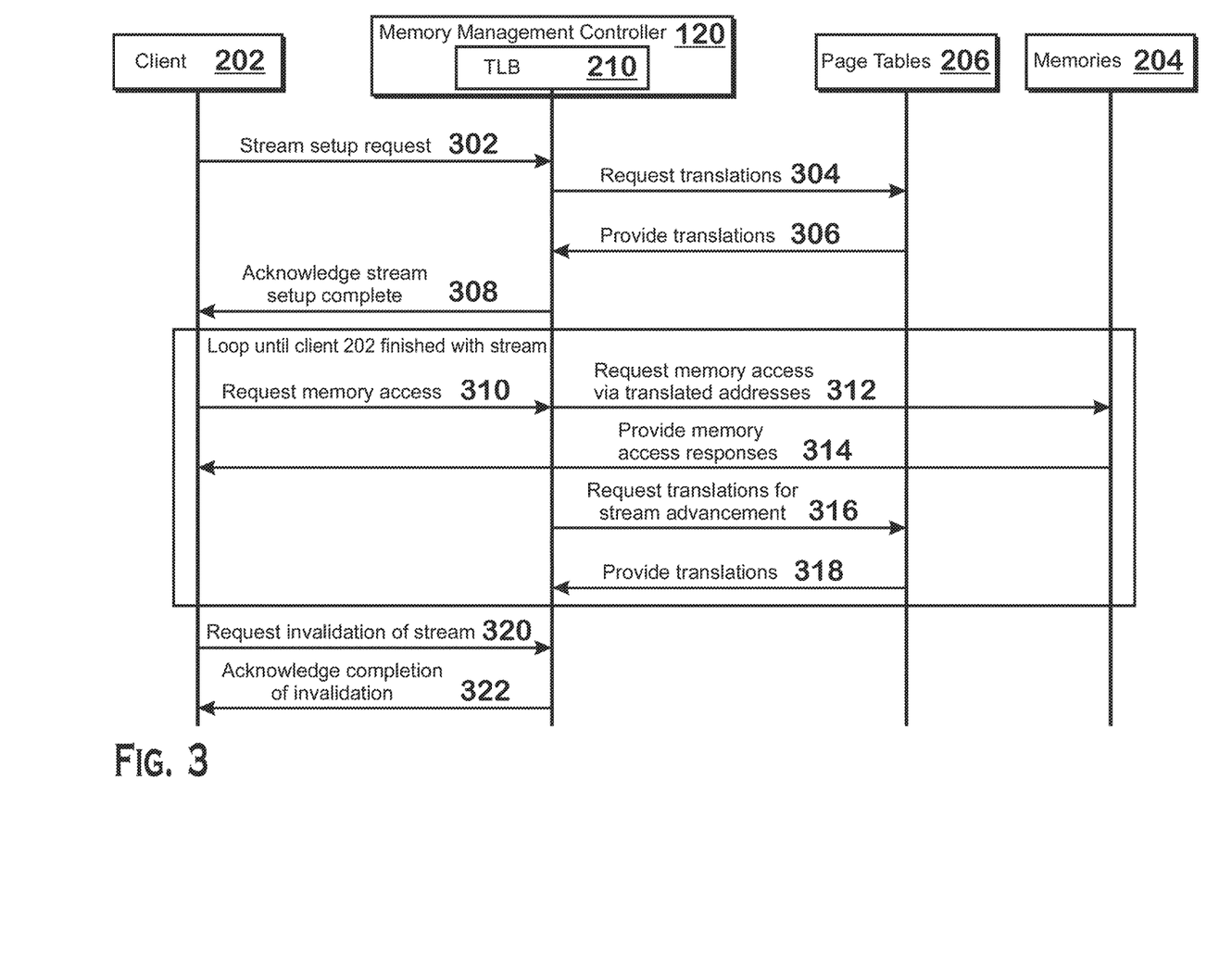
FIG. 3 illustrates details of operation of a client, a translation lookaside buffer, page tables, and memory, according to an example.

FIG. 3 illustrates details of operation of a client 202, the TLB 210, the page tables 206, and the memories 204, according to an example. To access memory, the client 202 sends a stream setup request 302 to the TLB 210. The stream setup request 302 specifies a range of virtual memory addresses for which translation is desired. In response to the stream setup request, the TLB 210 requests translations at transaction 304 from the page tables 206 (which may occur through one or more caches—such as a level 2 address translation cache—that are higher than the TLB 210 in a translation cache hierarchy). In response to this request for translations, the page tables 206 provide the requested translations to the TLB 210 at transaction 306, which stores the translations in a translation memory 218 associated with a particular stream 212 (where again, a stream 212 is defined by a client ID 214 and an address range 216). The translation memory 218 is not large enough to store all translations for a stream 212, so the TLB 210 fetches enough translations to fill the translation memory 218. Later, as the translations are used by the client 202, the TLB 210 fetches new translations, replacing older translations in a first-in-first-out manner. This continuous pre-fetch occurs sequentially through the virtual memory address range specified for a stream 212 in a monotonically increasing manner.

Upon receiving the initial address translations for a particular stream 212 from the page tables 206, the TLB 210 sends an acknowledgment message to the client 202 at transaction 308, indicating that the stream has been initialized. In response to this acknowledgment, the client 202 requests access to the data referenced by the virtual addresses for which the translations are now stored in the TLB 210, at transaction 310. In response, the memory management controller 120 translates the virtual addresses via the entries now stored in the TLB 210 and accesses data in the memories 204 based on the translated addresses at transaction 312. The memories 204 perform the requested actions and/or provide requested data to the client 202 at transaction 314. The TLB 210 prefetches new translations for stream advancement at transaction 316. More specifically, after the TLB 210 performs the translations for the memory access request at transaction 310, those translations are no longer needed for the client 202. Thus, the TLB 210 fetches new translations to advance the stream 212. The new translations fetched are translations for memory addresses that are immediately after the memory addresses associated with the memory accesses just performed. At transaction 318, the page tables 206 provide the requested translations for storage in the TLB 210, replacing the older translations in a first-in-first-out manner. Transactions 310 through 318 loop until a client 202 is finished with the stream 212. The client is finished with the stream 212 when the client has accessed data for the range of virtual memory address specified for the stream 212 or when some other event occurs that indicates that the stream 212 is complete. After the stream is complete, the client 202 requests invalidation of the stream at transaction 320. This invalidation transaction invalidates the data for the stream, such as the address ranges, the client identifier, and the translations, so that the memory that stores that data in the TLB 210 can be used for another stream 212.

The sequence of operations illustrated in FIG. 3 differs from those used for a translation lookaside buffer that does not service contiguous streams of a virtual memory address space, such as a translation lookaside buffer associated with a memory management unit ("MMU") that services memory access requests that exhibit a more "random access" pattern, such as those made by the processor 102. More specifically, such TLBs do not communicate directly with a client (such as the processor 102) but instead serve simply as caches for virtual memory address translations made by the MMU. In such situations, to access memory, a client simply requests, via the MMU, access to memory based on a particular virtual memory address. In response, the MMU translates the virtual memory addresses, using translations stored in a TLB if available and climbing the address translation cache hierarchy as necessary, ultimately performing a page table walk if the needed translations are not stored in any address translation cache hierarchy level. Once the MMU obtains the translations for the virtual memory addresses specified by the client, the MMU translates the memory addresses to physical memory addresses and performs the requested memory accesses, returning data and/or an acknowledgment of the access to the client. With such TLBs and memory access patterns, the client does not request initialization of a pre-fetch stream, does not receive an acknowledgment that a pre-fetch stream has been initialized, and does not wait for the acknowledgment of completion of stream initialization before performing accesses. Instead, the client only makes the memory access request, without regard for what is actually stored in the TLB. As described herein, for high performance applications, misses in the TLB associated with such types of access patterns could result in unacceptable memory access latency.

Figure 4A:
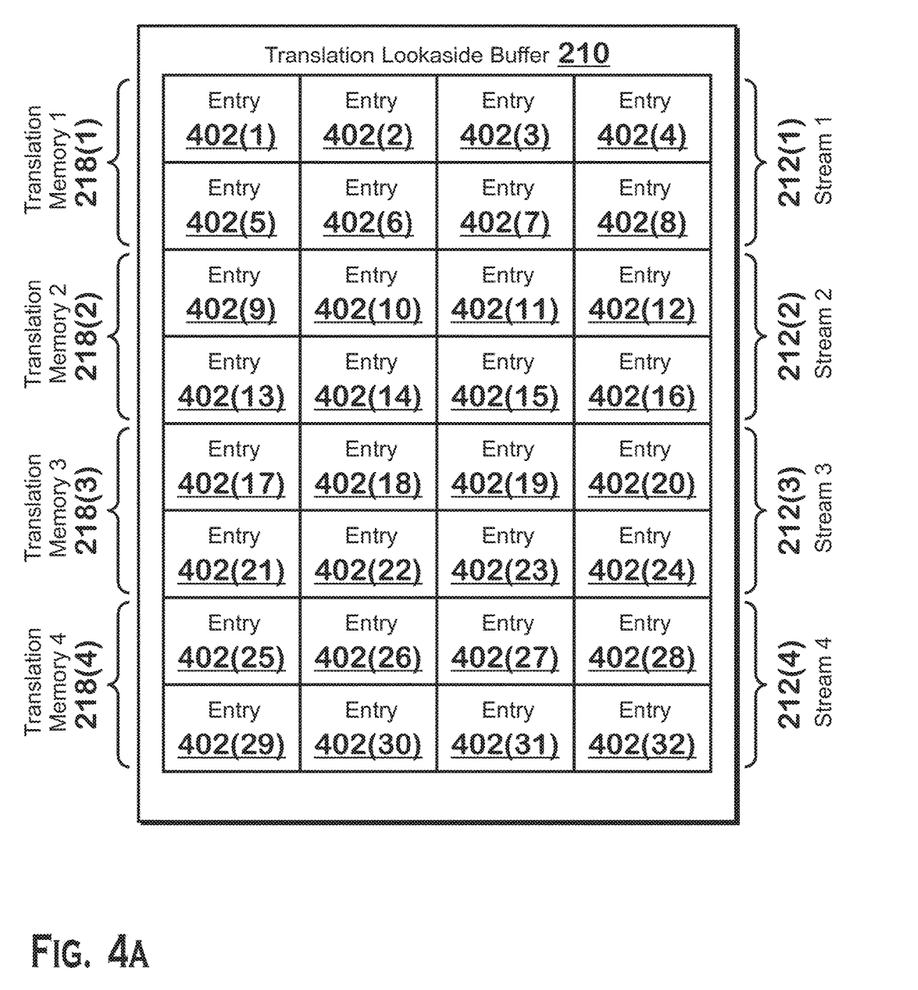
FIGS. 4A-4B illustrate additional aspects of the translation lookaside buffer, according to examples.
Figure 4B:
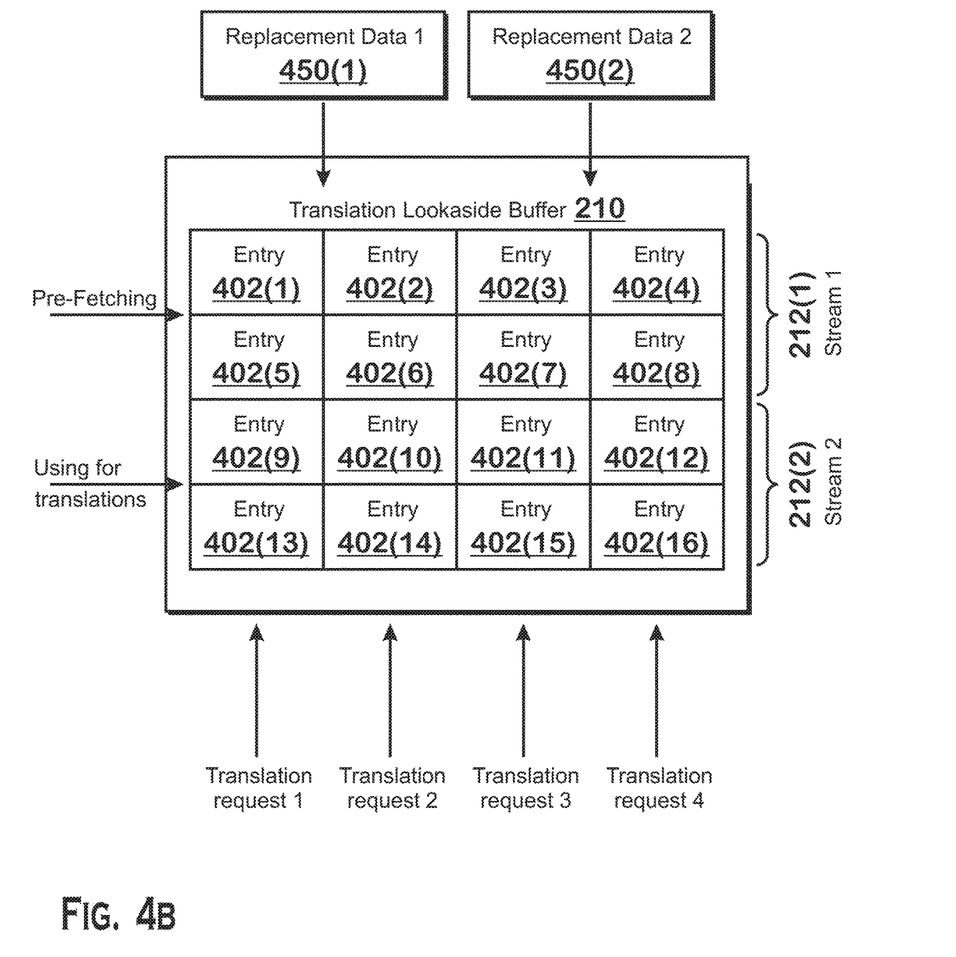

FIGS. 4A-4B illustrate additional aspects of the TLB 210, according to examples. FIG. 4A illustrates an example of the organization of entries 402 stored in the TLB 210 for different streams 212. Each entry 402 represents a unit of translation storage and may include one or more translations. In some implementations, each entry 402 stores the same number of translations. Within the TLB 210, each stream 212 is assigned a particular number of entries 402, which together comprise a translation memory 218. Responsive to a client requesting pre-fetching for a particular stream 212, the TLB 210 allocates entries 402 for that stream 212 and fetches the requested translations into the entries 402 assigned to that stream 212. Responsive to a client 202 requesting invalidation of the entries (after the client has performed the memory accesses for the physical memory addresses specified by the translations for a particular stream 212), the TLB 210 invalidates the entries 402 and is later able to assign the invalidated entries 402 to a new stream 212.

FIG. 4B illustrates additional operations associated with the TLB 210, according to an example. Caches use replacement policies to determine which particular entry 402, in a set of entries 402 to overwrite for new cache data. The TLB 210 described herein uses a simple first-in-first-out replacement policy instead of something more complex such as a least-recently-used replacement policy. More specifically, because any particular stream 212 explicitly instructs the TLB 210 regarding what translations are required, the simplest replacement policy—the replacement policy in which the TLB 210 treats entries 402 assigned to a stream 212 as a circular buffer—is sufficient. Treating the entries 402 as a circular buffer means that the TLB 210 writes entries in a contiguous fashion and, when the last entry 402 is written in a particular translation memory 218, the TLB 210 "wraps around" to the first such memory.

Additionally, due to the contiguous nature of accesses, the TLB 210 uses "overfetch" to reduce the number of operations that are to be performed in order to fetch translations from the page tables 206 and store requested translations in the TLB 210. More specifically, in a TLB in which different entries store translations for non-contiguous virtual memory addresses, an operation to obtain translations from a page table 206 typically retrieves data for more than one translation due to the fact that memory requests and accesses occur within a computer system for amounts of data greater than what is necessary for a single translation. This excessive retrieval results in "overfetch," with much of the fetched data being discarded. In the TLB 210 described herein, because translations are for contiguous portions of the virtual address space, a fetch that would otherwise result in overfetch instead simply results in retrieval of multiple translations for contiguous portions of memory. Instead of discarding data for everything but a single translation, the TLB 210 is thus able to keep more of the translations retrieved in a single fetch operation. Keeping translations in this manner reduces the number of fetch operations necessary to obtain a particular number of translations.

FIG. 4B also illustrates a "double buffering" operation in which a certain set of entries 402 are being pre-fetched while a different set of entries 402 are used for translations for memory accesses. More specifically, to reduce latency of operation and ensure that translations are available, the TLB 210 uses two different translation memories 218 for a single stream. A first translation memory 218 fetches translations from the page tables 206 while a second translation memory 218 is used by the client 202 to perform memory address translations. In FIG. 4B, stream 1 212(1) is used for pre-fetching and stream 2 212(2) is being used for translations. When the TLB 210 has filled a single translation memory 218, the translations in that translation memory 218 are available for the client 202 and the TLB 210 begins fetching translations for the other translation memory 218. The client 202 accesses memory via the first translation memory 218 while translations are being fetched into the second translation memory 218. The roles of the two translation memories 218 are switched when the client 202 has finished performing the memory accesses for the translations stored in the first translation memory 218.

Figure 5:
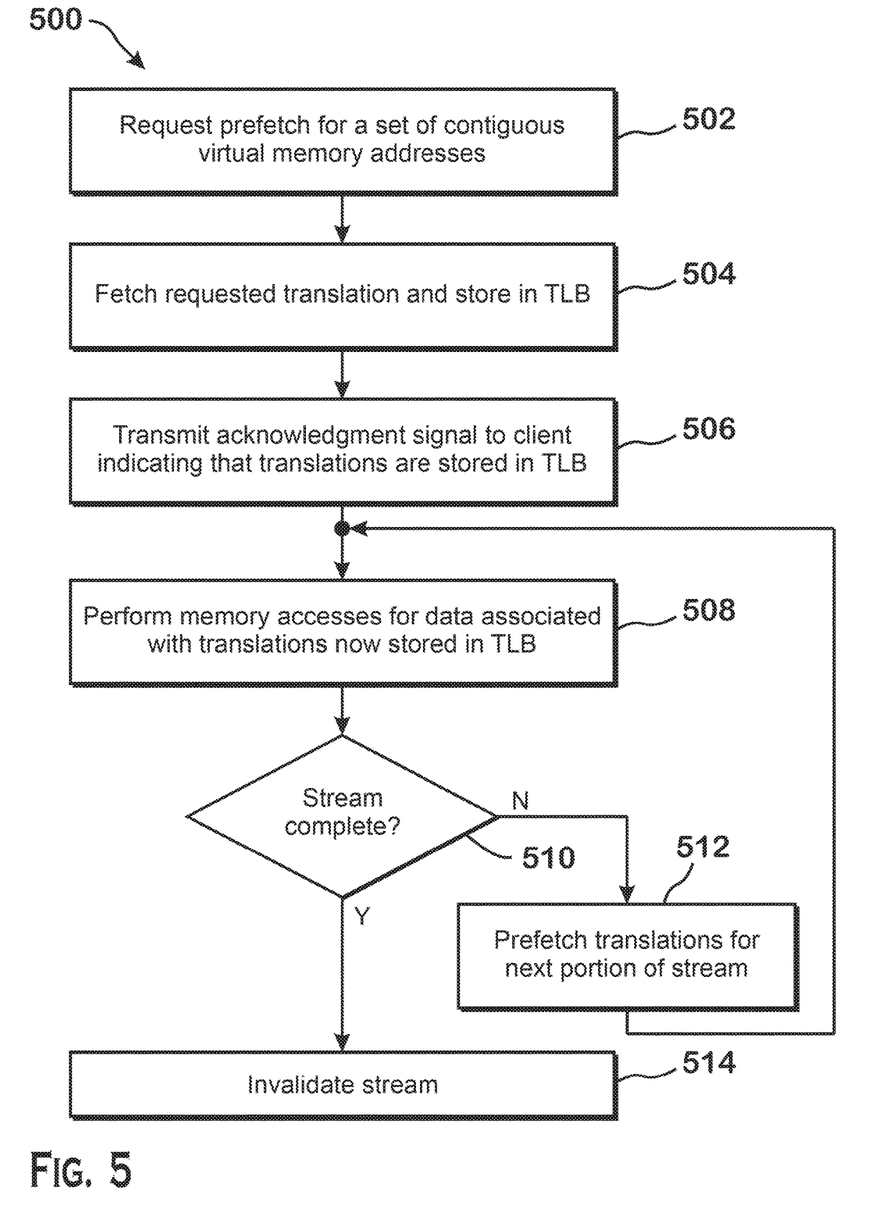
FIG. 5 is a flow diagram of a method for pre-fetching memory address translations and accessing data stored in memory using those translations, according to an example.

FIG. 5 is a flow diagram of a method 500 for pre-fetching memory address translations and accessing data stored in memory using those translations, according to an example. Although described with respect to the system shown and described with respect to FIGS. 1-3 and 4A-4B, it should be understood that any system configured to perform the method, in any technically feasible order, falls within the scope of the present disclosure.

The method 500 begins at step 502, where a client 202 requests initialization of a pre-fetch stream 212 for address translations for a set of contiguous virtual memory addresses. The request includes a start virtual address and an end virtual address, defining a virtual memory address range. In requesting these pre-fetches, the client 202 is preparing to read data from memories 204 using the address translations being pre-fetched. These explicit requests to pre-fetch avoid latencies associated with cache misses in a TLB that might occur without such pre-fetches.

In response to the requests to initialize a pre-fetch stream, the TLB 210 fetches the requested translations from the page tables 206 and stores the translations in the TLB 210, at step 504. The TLB 210 can use overfetch, in which requests to fetch address translations fetch more than one translation, advantageously, because the address translations being fetched are for contiguous virtual memory addresses and translations for contiguous virtual memory addresses are stored at least partially contiguously in the page tables 206. At step 506, after storing the requested translations, the TLB 210 transmits an acknowledgment that the requested translations are stored in the TLB 210 to the client 202 that made the pre-fetch request. In response, in step 508, the client 202 performs the memory accesses for data referenced by the virtual addresses of the fetched translations. These memory accesses include providing virtual addresses and access types (e.g., read, write, or the like) to the memory management controller 120, which searches the TLB 210 for the translations. Finding the translations in the TLB 210 (which are stored in the TLB due to the pre-fetches), the memory management controller 120 obtains the physical addresses specified by the translation, and makes the specified memory accesses. At step 510, the TLB 210 determines whether the stream is complete. The stream is complete when client 202 has accessed all the memory in the range specified for the stream 212. If the stream is complete, then the method proceeds to step 514, where the client 202 invalidates the stream. If the stream is not complete, then the method proceeds to step 512. At step 512, the TLB 210 prefetches translations for the next portion of the stream 212. Although illustrated in a particular sequence in FIG. 5, steps 508 510, and 512 may occur in "overlapping time periods." For example, the TLB 210 may prefetch translations for the next portion of the stream while the client 202 is performing memory accesses using already-fetched portions of the stream (e.g., in the double buffering scheme described above).

Some example access patterns for different types of clients are now briefly described. Graphics processing units ("GPUs") fetch data associated with three-dimensional graphics rendering (or with general purpose, single-instruction-multiple-data-based computing) and process that data to output a rendered image or other result. In many situations, data accessed by a GPU is included in a large, contiguously-virtually-addressed portion of memory. In such situations, the GPU accesses data in monotonically-increasing virtual address order. The GPU uses the above streaming technique for such accesses.

Video encoders and video decoders also access large portions of contiguously-virtually-addressed. A video encoder obtains video data in one format, performs encoding on that video data to provide encoded video, and outputs that video. A video decoder obtains video data in an encoded format, performs decoding on that video data, and outputs decoded video. Similarly to the GPUs, the video encoders and video decoders proceed through large portions of data, creating streams 212 to pre-fetch translations for that data.

A method for accessing data stored in a memory is provided. The method includes initializing a TLB pre-fetch stream for a client, wherein the initializing includes performing a pre-fetch operation to fetch virtual-to-physical memory address translations into a TLB. The method also includes receiving, from the client, a memory access request to access data stored at virtual addresses for which translations are stored in the TLB. The method further includes translating the virtual addresses to physical addresses based on the translations. The method also includes accessing memory based on the memory access request and the physical addresses.

A memory system is also provided. The memory system includes one or more memories, page tables stored in the one or more memories, and a memory management controller including a TLB. The memory management controller is configured to initialize a TLB pre-fetch stream for a client, wherein the initializing includes performing a pre-fetch operation to fetch virtual-to-physical memory address translations from the page tables into the TLB. The memory management controller is also configured to receive, from the client, a memory access request to access data stored at virtual addresses for which translations are stored in the TLB. The memory management controller is further configured to translate the virtual addresses to physical addresses based on the translations. The memory management controller is also configured to access memory based on the memory access request and the physical addresses.

A computer system is provided. The computer system includes a client and a memory system. The memory system includes one or more memories, page tables stored in the one or more memories, and a memory management controller including a TLB. The memory management controller is configured to initialize a TLB pre-fetch stream for the client, wherein the initializing includes performing a pre-fetch operation to fetch virtual-to-physical memory address translations from the page tables into the TLB. The memory management controller is also configured to receive, from the client, a memory access request to access data stored at virtual addresses for which translations are stored in the TLB. The memory management controller is further configured to translate the virtual addresses to physical addresses based on the translations. The memory management controller is also configured to access memory based on the memory access request and the physical addresses.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for accessing data stored in memory, the method comprising:
   receiving from a client, at a translation lookaside buffer ("TLB"), a request to initialize a pre-fetch stream for a set of contiguous virtual memory addresses, the request including a start virtual address and an end virtual address;
   responsive to the request, initializing the pre-fetch stream for the client, wherein the initializing includes performing a pre-fetch operation to fetch virtual-to-physical memory address translations into the TLB;
   responsive to performing the pre-fetch operation, transmitting an acknowledgment to the client that the pre-fetch stream is initialized;
   responsive to receiving the acknowledgment, generating by the client, a memory access request to access data stored at virtual addresses for which the pre-fetch operation pre-fetched translations;
   translating the virtual addresses to physical addresses based on the translations;
   accessing memory based on the memory access request and the physical addresses;
   in response to accessing the last memory address, by the client, in the range defined by the start virtual address and the end virtual address, transmitting an invalidation request from the client to the TLB to invalidate the translations associated with the pre-fetch stream; and
   responsive to the invalidation request, invalidating entries in the TLB associated with the pre-fetch stream.

2. The method of claim 1, wherein:
   initializing the TLB pre-fetch stream comprises specifying a virtual memory address range for the TLB pre-fetch stream; and
   the method further comprises performing additional pre-fetch operations to pre-fetch additional memory address translations for the pre-fetch stream, the additional memory address translations being subsequent to the memory address translations for the pre-fetch stream initialization, in the virtual memory address space and within the virtual memory address range specified for the TLB pre-fetch stream.

3. The method of claim 2, wherein performing the additional pre-fetch operations includes replacing translations in the TLB with a first-in-first-out replacement policy.

4. The method of claim 2, wherein performing the additional pre-fetch operations comprises performing an over-fetch operation that comprises fetching multiple virtual-to-physical memory address translations in one transaction and storing more than one of the multiple virtual-to-physical memory address translations in the TLB.

5. The method of claim 2, further comprising:
   performing a double buffering operation comprising performing the additional pre-fetch operations while providing memory address translations for memory accesses by the client.

6. The method of claim 1, wherein the client comprises one of: a camera controller configured to copy data from a buffer storing video frame data to a different part of memory for processing, a video encoder, a video decoder, a graphics processing unit, or an interrupt controller.

7. A memory system, comprising:
   one or more memories;
   page tables stored in the one or more memories; and
   a memory management controller including a translation lookaside buffer ("TLB"), wherein the memory management controller is configured to:
   receive from a client, at the TLB, a request to initialize a pre-fetch stream for a set of contiguous virtual memory addresses, the request including a start virtual address and an end virtual address;
   responsive to the request, initialize the pre-fetch stream for the client, wherein the initializing includes performing a pre-fetch operation to fetch virtual-to-physical memory address translations from the page tables into the TLB;
   responsive to performing the pre-fetch operation, transmit an acknowledgment to the client that the pre-fetch stream is initialized;
   responsive to receiving the acknowledgment, generate, by the client, a memory access request to access data stored at virtual addresses for which the pre-fetch operation pre-fetched translations;
   translate the virtual addresses to physical addresses based on the translations;
   access memory based on the memory access request and the physical addresses;
   in response to accessing the last memory address, by the client, in the range defined by the start virtual address and the end virtual address, transmit an invalidation request from the client to the TLB to invalidate the translations associated with the pre-fetch stream; and responsive to the invalidation request, invalidate entries in the TLB associated with the pre-fetch stream.

8. The memory system of claim 7, wherein:

the memory management controller is configured to initialize the TLB pre-fetch stream by specifying a virtual memory address range for the TLB pre-fetch stream; and the memory management controller is further configured to perform additional pre-fetch operations to pre-fetch additional memory address translations for the pre-fetch stream, the additional memory address translations being subsequent to the memory address translations for the pre-fetch stream initialization, in the virtual memory address space and within the virtual memory address range specified for the TLB pre-fetch stream.

9. The memory system of claim 8, wherein the memory management controller is configured to perform the additional pre-fetch operations by replacing translations in the TLB with a first-in-first-out replacement policy.

10. The memory system of claim 8, wherein the memory management controller is configured to perform the additional pre-fetch operations by performing an overfetch operation that comprises fetching multiple virtual-to-physical memory address translations in one transaction and storing more than one of the multiple virtual-to-physical memory address translations in the TLB.

11. The memory system of claim 8, wherein the memory management controller is further configured to:

perform a double buffering operation comprising performing the additional pre-fetch operations while providing memory address translations for memory accesses by the client.

12. The memory system of claim 7, wherein the client comprises one of: a camera controller configured to copy data from a buffer storing video frame data to a different part of memory for processing, a video encoder, a video decoder, a graphics processing unit, or an interrupt controller.

13. A computer system, comprising:

a client; and a memory system, comprising:

one or more memories;

page tables stored in the one or more memories; and a memory management controller including a translation lookaside buffer ("TLB"), wherein the memory management controller is configured to:

receive from the client, at the TLB, a request to initialize a pre-fetch stream for a set of contiguous virtual memory addresses, the request including a start virtual address and an end virtual address;

responsive to the request, initialize the TLB pre-fetch stream for the client, wherein the initializing includes performing a pre-fetch operation to fetch virtual-to-physical memory address translations from the page tables into the TLB;

responsive to performing the pre-fetch operation, transmit an acknowledgment to the client that the pre-fetch stream is initialized;

responsive to receiving the acknowledgment, generate, by the client, a memory access request to access data stored at virtual addresses for which the pre-fetch operation pre-fetched translations;

translate the virtual addresses to physical addresses based on the translations;

access memory based on the memory access request and the physical addresses;

in response to accessing the last memory address, by the client, in the range defined by the start virtual address and the end virtual address, transmit an invalidation request from the client to the TLB to invalidate the translations associated with the pre-fetch stream; and responsive to the invalidation request, invalidate entries in the TLB associated with the pre-fetch stream.

14. The computer system of claim 13, wherein:

the memory management controller is configured to initialize the TLB pre-fetch stream by specifying a virtual memory address range for the TLB pre-fetch stream; and the memory management controller is further configured to perform additional pre-fetch operations to pre-fetch additional memory address translations for the pre-fetch stream, the additional memory address translations being subsequent to the memory address translations for the pre-fetch stream initialization, in the virtual memory address space and within the virtual memory address range specified for the TLB pre-fetch stream.

* * * * *